(12) United States Patent
Pender

(10) Patent No.: US 7,111,861 B2
(45) Date of Patent: Sep. 26, 2006

(54) ADJUSTABLE FRONT WHEEL ASSEMBLY FOR VEHICLES

(76) Inventor: Kevin K. Pender, P.O. Box 1223, Ramona, CA (US) 92065

( * ) Notice: Subject to any disclaimer, the term of this patent is extended or adjusted under 35 U.S.C. 154(b) by 0 days.

(21) Appl. No.: 10/943,774

(22) Filed: Sep. 17, 2004

(65) Prior Publication Data
US 2006/0060405 A1    Mar. 23, 2006

(51) Int. Cl.
*B62K 21/02* (2006.01)
(52) U.S. Cl. .................... 280/279; 180/219
(58) Field of Classification Search ........... 280/279, 280/280, 278, 281.1, 287, 775; 180/219; 74/551.3, 551.6
See application file for complete search history.

(56) References Cited
U.S. PATENT DOCUMENTS

| | | | | |
|---|---|---|---|---|
| 3,866,946 A | | 2/1975 | Robison | |
| 4,162,797 A | * | 7/1979 | McBride | 280/275 |
| 4,378,857 A | * | 4/1983 | Andersson | 180/227 |
| 4,565,384 A | * | 1/1986 | Dehnisch | 280/279 |
| 4,600,207 A | * | 7/1986 | Zosi | 280/279 |
| 4,624,470 A | | 11/1986 | Love | |
| 4,700,963 A | * | 10/1987 | Burns et al. | 280/276 |
| 5,967,538 A | | 10/1999 | Callaluca et al. | |
| 6,786,499 B1 | * | 9/2004 | Ackley | 280/276 |
| 2004/0094931 A1 | | 5/2004 | Ackley | |

FOREIGN PATENT DOCUMENTS
EP    1386834 A2    2/2003

* cited by examiner

*Primary Examiner*—Tony Winner
(74) *Attorney, Agent, or Firm*—Thomas Thibault

(57) ABSTRACT

An apparatus for adjusting a front-end front wheel assembly rake angle are disclosed. An individual wishing to convert a chopper-type motorcycle into a "stock" type motorcycle (or vice-versa) can easily do so without disassembly of the front wheel assembly. The apparatus comprises a main frame member having a front end, a front wheel assembly rotatably connected to the front end, and means for adjusting a rake angle of the front wheel assembly without disassembly of the front wheel assembly.

6 Claims, 9 Drawing Sheets

ADJUSTABLE FRONT WHEEL ASSEMBLY FOR VEHICLES

FIELD

The embodiments described herein pertain generally to the field of motorized and non-motorized vehicles, such as motorcycles, bicycles, three-wheelers, and the like. More particularly, the embodiments described herein relate to an apparatus for adjusting a front wheel assembly rake angle of such vehicles.

BACKGROUND

The steering and stability characteristics of motorcycles, bicycles and other similar types of vehicles can be varied and altered in a number of different ways. For example, altering the front wheel assembly rake and trail angles can change the steering and stability characteristics of a motorcycle. The rake angle is defined as that angle which the steering axis of the front wheel assembly of the motorcycle has relative to an imaginary vertical axis or plane. Thus, if an imaginary vertical plane is passed through the steering head assembly of a motorcycle, the rake angle is that angle formed between such plane and the steering axis of the front wheel assembly. The horizontal distance of the forward wheel's axle from a pre-defined measure is generally referred to as a motorcycle's trail. A motorcycle's trail has been defined as the horizontal distance by which a vertical plane, passing through the front wheel axle trails the point of intersection of the steering axis with a horizontal ground.

Variations in the rake and trail angle of a motorcycle will provide different ride and steering characteristics. For example, in a chopper-type motorcycle, the rake angle may be quite large, such as 35 degrees or more. This design allows motorcycles to be very stable at high speeds on straight roads and also is very comfortable to ride for long distances. However, chopper-type motorcycles are difficult to steer on winding roads, as they generally require much upper body strength to maneuver the motorcycle. On the other hand, if the rake angle is considerably smaller, i.e., 28 degrees or less, the motorcycle steering will be quite sensitive and responsive, but the stability of the motorcycle on a fast straight section of road tends to be considerably less than desirable. Also, riding for a considerable distance tends to be uncomfortable, as the rider is positioned in more of an upright position than would be on a chopper-type motorcycle.

Heretofore, motorcycle owners have had to choose between chopper-type motorcycles and "stock" motorcycles (i.e., those motorcycles having a relatively small rake angle). However, certain motorcycle designs have been devised which allow changing of the rake angle depending upon road conditions and motorcycle use. In particular, U.S. Pat. Nos. 3,866,946 and 4,082,307, U.K. Pat. No. 570,439 and Italian Pat. No. 523,424 all disclose various mechanical arrangements which permit the rake angle of the front fork assembly of a motorcycle to be changed. While each of the designs disclosed in these particular patents are specifically different, they all achieve fork angle change basically in the same manner. This manner requires that the motorcycle be stopped, that the operator then disassemble portions of the motorcycle steering head assembly to remove or alter components thereof in order to change the rake angle, and that the operator then reassemble the steering head components with the rake angle at its new position. Should the operator subsequently choose to again change the rake angle due to new road conditions or the like, the same cumbersome and time consuming procedure is required. Thus, while the rake angle of such motorcycle front wheel assembly designs is variable, it certainly cannot be varied conveniently. Moreover, these designs do not permit variance of the fork angle during actual operation of the motorcycle.

Another shortcoming of motorcycles today is that they are typically mass-produced and do not allow a purchaser a customized "fit". The purchaser is forced to buy the motorcycle "as is" and must then alter it to accommodate his or her body.

Consequently, there is a need for a motorcycle front wheel assembly design wherein the rake angle can be easily changed as desired by the motorcycle operator to permit larger rake angles during straight away motorcycle operation and shorter rake angles during turning and off-road operations.

SUMMARY

The embodiments described herein pertain to an apparatus for adjusting a front-end front wheel assembly rake angle. In one embodiment, a vehicle having at least two wheels is disclosed, the vehicle comprising a vehicle frame, a front wheel assembly rotatably connected to the frame, and means for adjusting the rake angle of the front wheel assembly without disassembly of the front wheel assembly.

In another embodiment, the vehicle comprises means for altering the length of the front wheel assembly.

It is an object of the present invention to provide a convenient way for motorcycle enthusiasts to modify a motorcycle from a stock type to a chopper type motorcycle.

It is another object of the present invention to allow purchasers of motorcycles to modify a test motorcycle at a dealer so that a custom-fit motorcycle may be ordered for them.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes an apparatus for adjusting a front wheel assembly rake angle for a vehicle having at least two wheels. The embodiments described herein can be used in a number of different types of vehicles, such as motorcycles, bicycles, quads, three-wheelers, and the like. It should be understood, then, that all references to a motorcycle used herein could equally apply to these other types of vehicles. It should also be understood that the terms "pivotally" and "rotatably" have been used interchangeably, both meaning "to allow rotation about a singe axis".

Figure 1:
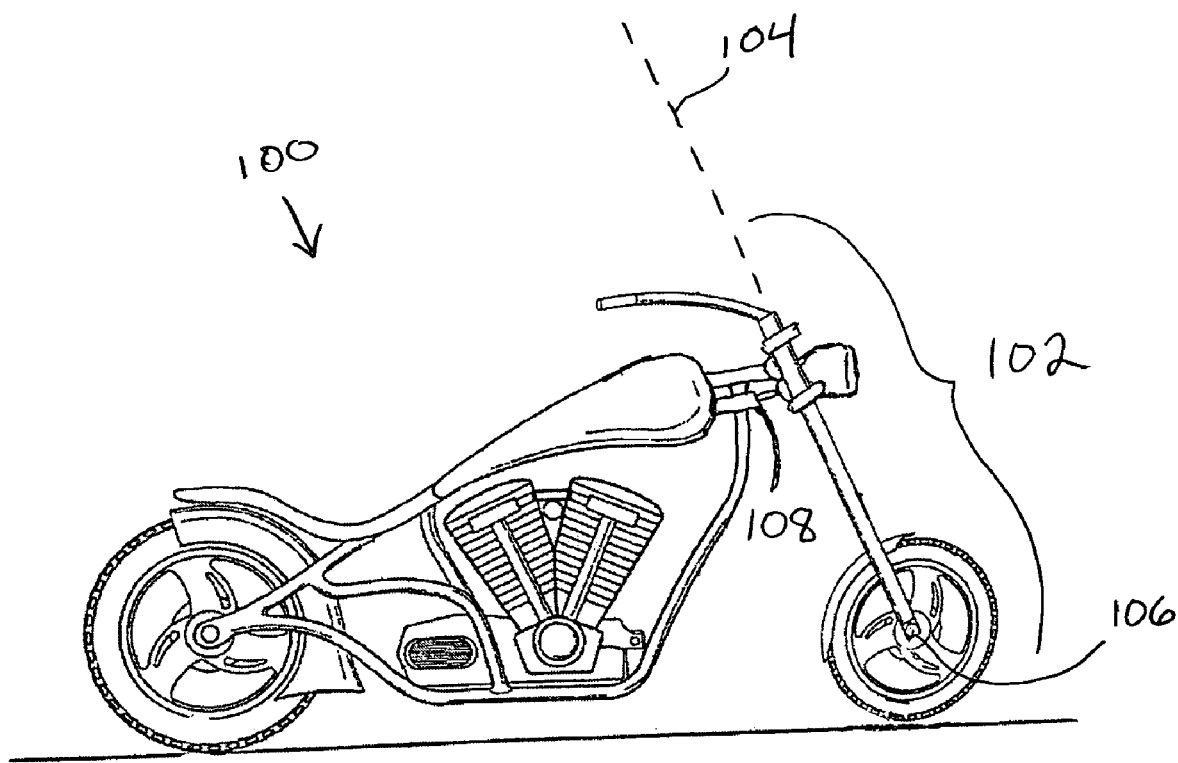
FIG. 1 illustrates a stock motorcycle, comprising components necessary to adjust a motorcycle front wheel assembly rake angle.

FIG. 1 illustrates a "stock" motorcycle 100 comprising components necessary to adjust the rake angle of the motorcycle front wheel assembly 102. Motorcycle 100 is shown as a stock type motorcycle, which traditionally offers a relatively small rake angle, i.e., a rake angle of less than 30 degrees. As previously stated, the rake angle is defined as that angle which the steering axis 104 of the front wheel assembly 102 of motorcycle 100 has relative to an imaginary vertical axis or plane. Thus, if an imaginary vertical plane is passed through the front axel 106, the rake angle is that angle formed between such plane and steering axis 104 of front wheel assembly 102. A small rake angle enables motorcycle 100 to steer and maneuver easily, but also forces the rider to sit upright, possibly causing an uncomfortable ride over long distances. Motorcycle 100 features means 108 for adjusting the front wheel assembly 102 rake angle without disassembly of front wheel assembly 102.

Figure 2:
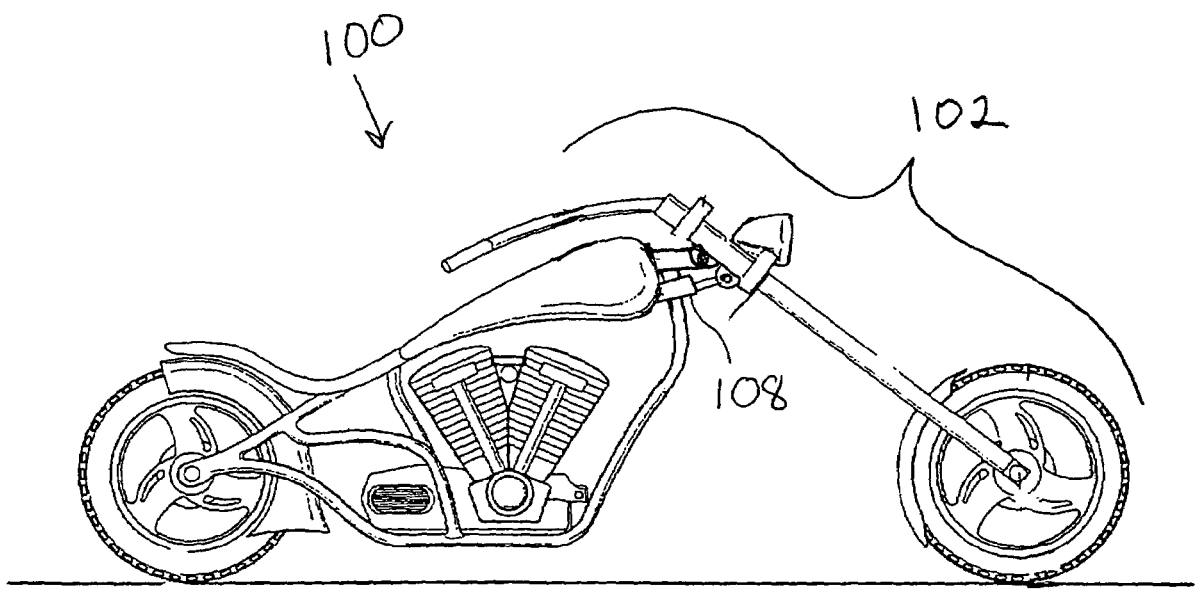
FIG. 2 illustrates the motorcycle of FIG. 1, shown as a chopper type motorcycle.

FIG. 2 illustrates the motorcycle 100 of FIG. 1, shown as a chopper type motorcycle, defined, in part, by a relatively large rake angle, i.e., a rake angle greater than 30 degrees. Motorcycle 100 comprises means 108 for adjusting the rake angle of front wheel assembly 102 without disassembly of front wheel assembly 102.

Figure 2A:
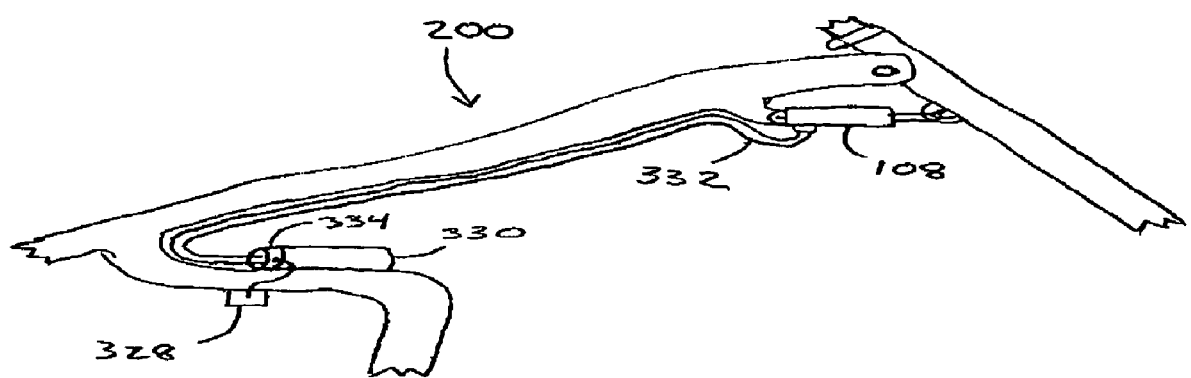
FIG. 2a illustrates a partial view of a motorcycle frame with components of one embodiment of an adjustable front wheel assembly.

FIG. 2a illustrates a partial view of a motorcycle frame 200 wit components of one embodiment of an adjustable front wheel assembly. Various components of a typical motorcycle have been omitted for clarity. FIG. 2a shows means 108 connected by way of a pneumatic hose 332 to a valve 334, which controls a liquid contained within container 330. The liquid is expelled from container, controlled by a switch 328 connected to valve 334. These components and their funtionality are explained in more detail below.

Figure 3:
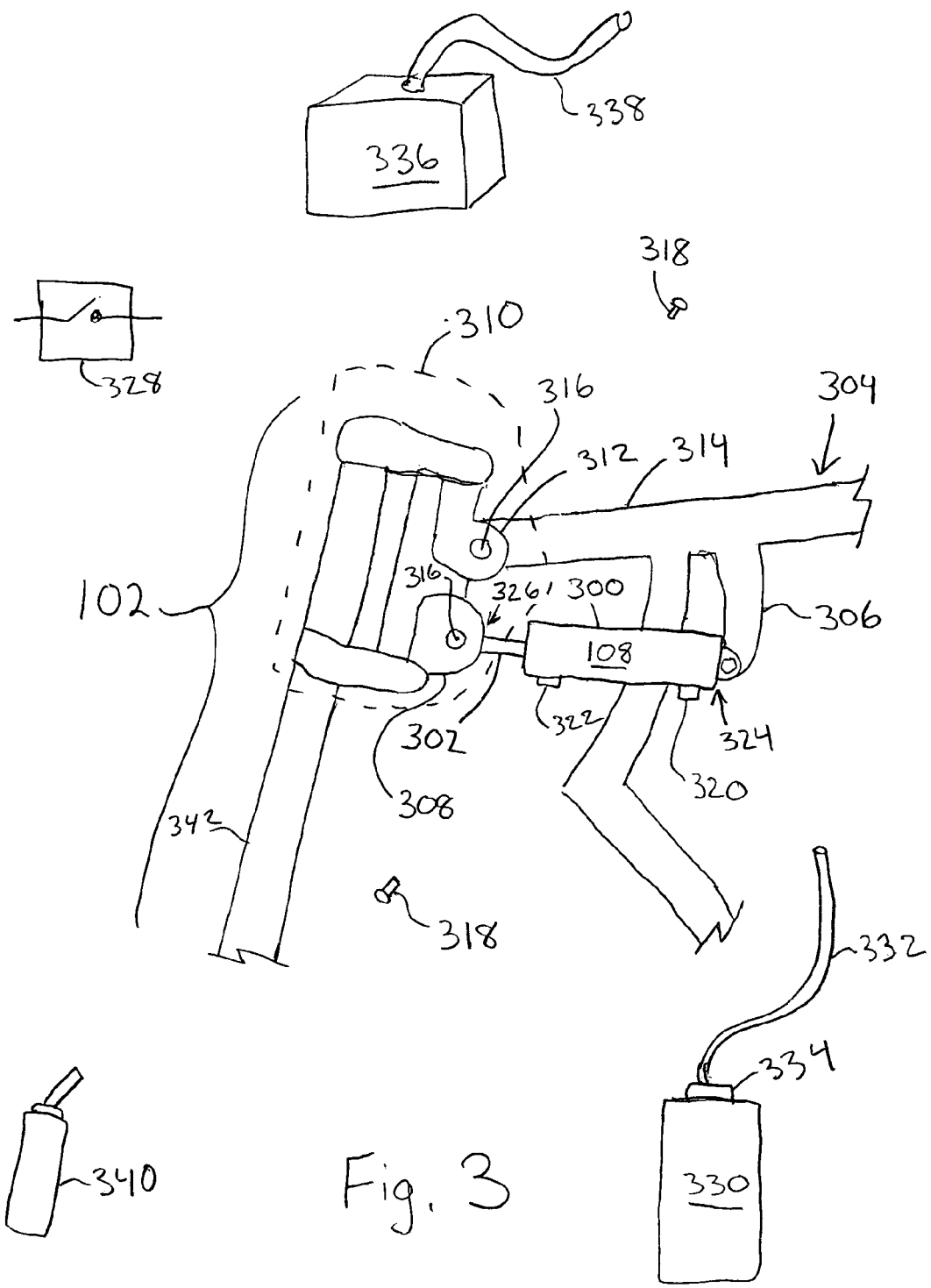
FIG. 3 illustrates a close-up view of one embodiment of the present invention.

FIG. 3 illustrates a close-up view of one embodiment of the present invention. Shown is one section of motorcycle 100, illustrating, among other things, means 108 for adjusting the rake angle of front wheel assembly 102. Means 108 comprises an expandable mechanism comprising a body 300 and an extension 302. A first end 324 of body 300 is rotatably fastened to frame 304, either directly thereto, or to a member 306 extending from frame 304. A first end 326 of extension 302 is rotatably fastened to a tab 308 of a steering head 310, in this embodiment, comprising a two-tab steering head. Tab 312 of steering head 310 is rotatably fastened to an upper member 314 of frame 304. To alter the rake angle of front wheel assembly 102, the extension 302 is moved axially relative to body 300. In one embodiment, means 108 comprises a hydraulic piston, for example, a single-state or a two-stage hydraulic piston. In another embodiment, means 108 comprises a pneumatic ram, for example, a single state or a two-stage pneumatic ram. A single-stage piston or a single stage ram comprises a single compartment for holding fluids or gasses, respectively. A two-stage piston or ram comprises a movable partition inside the body of the device, forming two independent chambers within the body. Typically, one inlet/outlet port is associated with each chamber. In yet another embodiment, means 108 comprises an airbag.

Tab 308 and tab 312 each comprise at least one semi-circular flange that is welded to steering head 310, or, alternatively, fabricated directly from steering head 310. Steering head 310 is a mechanism that pivotally connects forks 342 (only one fork 332 shown) to frame 304. The tabs 308 and 312 need not be semi-circular in shape—virtually any shape will suffice. The tabs 308 and 312 each have a through hole 316 formed at approximately the center of each tab. Each hole 316 is aligned with a respective hole formed on upper member 314 and second end of means 108, respectively. One fastener 318 each (shown in exploded view) is then inserted through each hole 316, respectively, thereby pinning the respective elements rotatably to one another. Tab 308 and tab 312 are then free to rotate about the central axis of each fastener, thereby allowing a large adjustment of front wheel assembly 102, and, therefore, the rake angle. Fasteners 318 can comprise a nut/bolt combination, a screw, a rivet, a pin, or any other suitable fastener known in the art.

In one embodiment where means 108 comprises a hydraulic piston, one or more ports may be used to allow hydraulic fluid, or the like, to enter and exit the piston. As shown in FIG. 3, means 108 comprises two such ports, port 320 and port 322. It should be understood that in other embodiments, port 320 and port 322 may be combined into a single port, allowing fluid to pass into and escape the piston.

When it is desired to increase the rake angle of the front wheel assembly 102, a hydraulic pump is connected to port 320, allowing hydraulic fluid, or the like, to enter the piston. In another embodiment, one or more hydraulic spools 340 are used to pump fluid into the piston. The one or more hydraulic spools 340 may be mounted conveniently on motorcycle 100, such as on the gas tank or on frame 304. If a two-stage piston is used, port 322 is opened to allow fluid to escape. In either case, as fluid is pumped into the piston, extension 302 is pushed outward, increasing the overall length of means 108. As the length is extended, front wheel assembly 102 is pivoted away from frame 304, rotating about both fasteners 318. The rake angle is, thus, increased until the desired angle is achieved. The hydraulic pump is then removed from port 320, where it automatically seals the fluid within the piston. One or both ports may, alternatively, be manually closed.

When it is desired to decrease the rake angle of the front wheel assembly 102, port 320 is opened, allowing the fluid within the piston to escape. If a two-stage piston is used, fluid may be pumped into port 322. In either case, front wheel assembly 102 is rotated about fasteners 318 toward frame 304, decreasing the rake angle. As front wheel assembly 102 is rotated toward frame 304, fluid escapes through port 320, allowing means 108 to decrease in length. This, in turn, allows movement of front wheel assembly 102 and, therefore, a reduction in the rake angle. When the desired rake angle is achieved, outlet one or both ports are closed so that no further fluid can enter or escape the piston.

In another embodiment, means 108 comprises a pneumatic ram, similar to the hydraulic piston, described above, except that the pneumatic ram operates on compressed gas, rather than fluids. In this embodiment, like the hydraulic piston embodiment, the pneumatic ram comprises one or more ports that are used to allow a gas, such as air, carbon dioxide, helium, nitrogen, to enter and exit the piston. The pneumatic ram is shown in FIG. 3 having two such ports, port 320 and port 322. It should be understood that in other embodiments, port 320 and port 322 may be combined into a single port, allowing gas to pass into and escape the ram.

When it is desired to increase the rake angle of the front wheel assembly 102, compressed gas is connected to port 320, allowing air, or some other type of compressed gas, to enter the ram. If a two-stage ram is used, port 418 is opened, allowing gas inside the ram to escape. The compressed gas may originate from a compressor, a container of compressed gas, or any other means for providing compressed gas to port 320. In one embodiment, a container of compressed gas 330 is mounted to motorcycle 100 for a convenient supply of compressed gas. The container 330 may be mounted anywhere that it is convenient to do so. A hose 332 may be connected from the container to port 320 and left in place, if desired. If a two-stage ram is used, a second hose may also be connected from the container to port 322 to allow gas to enter either port. The second hose may also be connected to a second container 330 if desired. Of course, in such an embodiment, one of the two hoses must be disconnected from one or the other port, or otherwise allow gas to escape one port, as the other port is pressurized. The compressed gas may be controlled manually by a valve 334 on container 330, or it may be accomplished electronically, with a switch 328 (shown in block diagram form) mounted conveniently for the rider, switch 328 wired to an electronic valve 334 located on the container 330. In another embodiment, an electric compressor 336 may be mounted to motorcycle 100, supplying compressed air to port 320 via hose 338. Again, switch 328 may be wired to the electric compressor to control air to inlet 314 and may be located anywhere on motorcycle 100. In yet another embodiment, compressed air is ported from the motorcycle engine (not shown) by a hole in the engine head. A valve is inserted into the hole so that compressed air from the engine can be controlled and provided to one or both ports as needed.

In any case, as the compressed gas enters the ram, extension 302 is pushed axially away from body 300 around fasteners 318, increasing the overall length of means 108. As the length is extended, front wheel assembly 102 is pivoted away from frame 304, rotating about both fasteners 318. The rake angle is, thus, increased until the desired angle is achieved. The compressed gas is then removed from port 320, where it automatically seals the gas, under pressure, within the ram. One or both ports may, alternatively, be manually closed.

When it is desired to decrease the rake angle of the front wheel assembly 102, port 322 is opened, allowing the compressed gas within the ram to escape. If a two-stage ram is used, compressed gas is connected to port 322. Front wheel assembly 102 then rotates about fasteners 318 toward frame 304, decreasing the rake angle. As front wheel assembly 102 rotates toward frame 304, gas escapes through port 322, in part due to the pneumatic ram decreasing in length and in part due to the compressed air naturally seeking ambiance with the atmosphere. In a two-stage ram design, compressed air entering port 322 forces gas out of port 320. When the desired rake angle is achieved, the ports are closed so that no further gas can enter or escape the ram.

In another embodiment of the present invention, the length of front wheel assembly 102 is changed when the rake angle is altered. Generally, when the rake angle of front wheel assembly 102 is increased, it is generally desired to increase the length of the assembly 102 to compensate for the loss of height of the front end of motorcycle 100. Similarly, when the rake of front wheel assembly 102 is decreased, it is generally desired to decrease the length of the assembly 102 to compensate for the increased height of the front end of motorcycle 100.

Figure 4:
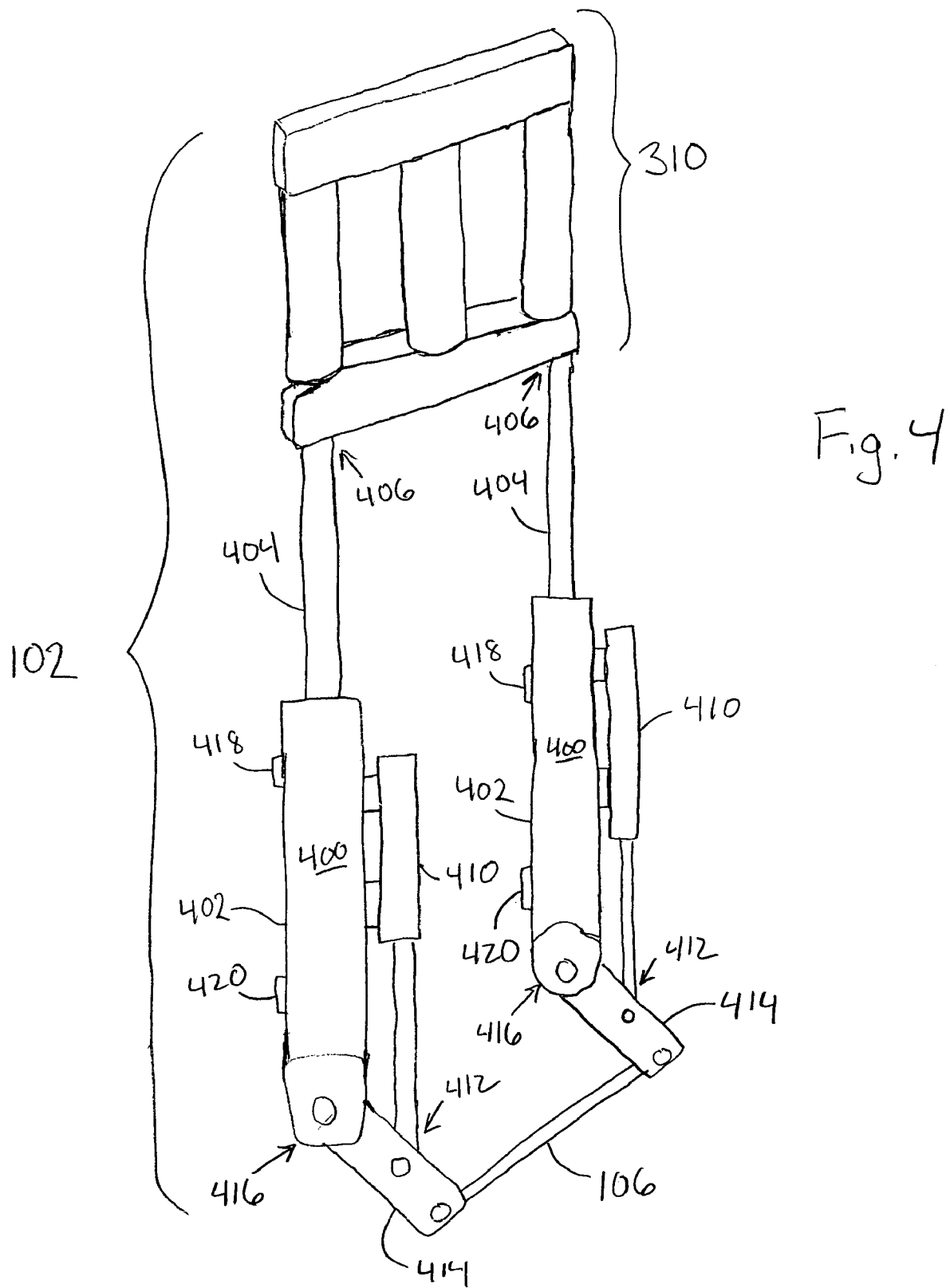
FIG. 4 illustrates a partial view of the front wheel assembly of FIG. 1 and FIG. 2.

The length of front wheel assembly 102 may be altered by using a means 400 for altering the length of front wheel assembly 102, as shown in FIG. 4. FIG. 4 illustrates a partial view of front wheel assembly 102, with some items not shown for purposes of clarity. In this embodiment, the front wheel assembly 102 comprises two means 400, each comprised of a body 402 and an extension 404. Each extension 404 comprises a first end 406 that is fixedly connected to steering head 310, which in turn connects to motorcycle frame 304 in the rotatable manner discussed above. First end 406 may be welded, screwed, bolted, or otherwise joined to steering head 310. Steering head 310 may be commonly known as a "triple tree," however steering head 310 is not limited to only triple trees, as other structures could be used in the alternative. A triple tree, as explained above, is Body 402 is fixedly joined to shock absorbers 410 by bolting, welding, or other means to fix the structures together. Each lower end 412 of the shock absorbers are pinned to a respective linkage 414 as shown in FIG. 4, each linkage 414 pinned to a respective lower end 416 of body 402 at one end, and connected to front axel 106 of the front motorcycle wheel (not shown). Pinning the linkages 414 to the shock absorbers 410 allows front wheel assembly 102 to flex and absorb variations in the road as motorcycle 100 is operated.

In one embodiment, means 400 comprises a hydraulic piston or a two-stage hydraulic piston having one or more ports that may be used to allow hydraulic fluid, or the like, to enter and exit the piston. As shown in FIG. 4, means 400 comprises two such ports, port 418 and port 420. It should be understood that in other embodiments, port 418 and port 420 may be combined into a single port, allowing fluid to pass into and escape the piston.

When it is desired to increase the length of front wheel assembly 102, a hydraulic pump may be connected to port 420, allowing hydraulic fluid, or the like, to enter the piston. In another embodiment, one or more hydraulic spools are used to pump fluid into the piston. The one or more hydraulic spools may be mounted conveniently anywhere on motorcycle 100. If a two-stage piston is used, port 418 is opened, allowing gas inside the ram to escape. In either case, as fluid is pumped into the piston, extension 404 is pushed axially away from body 402, increasing the overall length of means 400. As the length is extended, the length of front wheel assembly 102 is increased until the desired length of front wheel assembly 102 is achieved. The hydraulic pump is then removed from port 418, where it automatically seals the fluid within the piston. One or both ports may, alternatively, be manually closed.

When it is desired to decrease the length of front wheel assembly 102, port 420 is opened, allowing the fluid within the piston to escape. If a two-stage piston is used, fluid is pumped into port 418. As fluid escapes, extension 404 is pushed axially into body 402, thereby decreasing the overall length of means 400. A force may be placed downward on front wheel assembly 102 to help force the fluid out of body 402 faster if a two-stage piston is not used. As means 400 decreases in length, the overall length of front wheel assembly 102 is reduced. When the desired length of front wheel assembly 102 is achieved, the ports are closed so that no further fluid can escape the piston.

In another embodiment, means 400 comprises a pneumatic ram, similar to the hydraulic piston, described above, except that the pneumatic ram operates on compressed gas, rather than fluids. In this embodiment, like the hydraulic piston embodiment, the pneumatic ram comprises one or more ports that are used to allow a gas, such as air, helium, nitrogen, to enter and exit the piston. The pneumatic ram is shown in FIG. 4 having two such ports, port 418 and port 420. It should be understood that in other embodiments, port 418 and port 420 may be combined into a single port, allowing gas to pass into and escape the ram.

When it is desired to increase the length of front wheel assembly 102, compressed gas is connected to port 420, allowing air, or some other type of compressed gas, to enter the ram. If a two-stage ram is used, port 418 is opened, allowing gas inside the piston to escape. The compressed gas may originate from a compressor, a container of compressed gas, or any other means for providing compressed gas to port 420. In one embodiment, a container of compressed gas is mounted to motorcycle 100 for a convenient supply of compressed gas. This container may be the same container used to adjust means 108, described above. The container may be mounted anywhere that it is convenient to do so. A hose may be connected from the container to port 420 and left in place, if desired. If a two-stage ram is used, a second hose may also be connected from the container to port 418 to allow gas to enter either port. The second hose may also be connected to a second container 330 if desired. Of course, in such an embodiment, one of the two hoses must be disconnected from one or the other port, or otherwise allow gas to escape one port, as the other port is pressurized. The compressed gas may be controlled manually by a valve on the container(s), or it may be accomplished electronically, with a switch 328 mounted conveniently for the rider, the switch 328 wired to an electronic valve located on the container(s). In another embodiment, an electric compressor may be mounted to motorcycle 100, supplying compressed air to one or both ports. A second electric compressor may be used, so that each port may be independently fed. Again, a switch 328, conveniently located for the rider, may be wired to the electric compressor(s) to control air to the port(s). In addition, the compressor(s) may be the same compressor(s) for adjusting means 108, described above.

In any case, as the compressed gas enters the ram, extension 404 is pushed axially away from body 402, increasing the overall length of means 400. As the length is increased, the overall length of front wheel assembly 102 is also increased until the desired length of front wheel assembly 102 is achieved. The compressed gas is then removed or shut off from port 420, where it automatically seals the gas, under pressure, within the ram. One or both ports may, alternatively, be manually closed.

When it is desired to decrease the length of front wheel assembly 102, port 420 is opened, allowing the compressed gas within the ram to escape. If a two-stage ram is used, compressed gas is connected to port 418. Front wheel assembly 102 may then be pushed downward, aiding the escape of gas from means 400. If a two-stage ram is used, the compressed gas connected to port 418 forces extension 404 into body 402. As gas escapes through port 420, extension 404 moves axially into body 402, thus reducing the length of means 400. This, in turn, decreases the overall length of front wheel assembly 102. When the desired length of front wheel assembly 102 is achieved, outlet one or both ports are closed so that no further gas can escape the ram. Of course, as in the hydraulic piston embodiment, a single port may be used as both an inlet and an outlet port.

Figure 5:
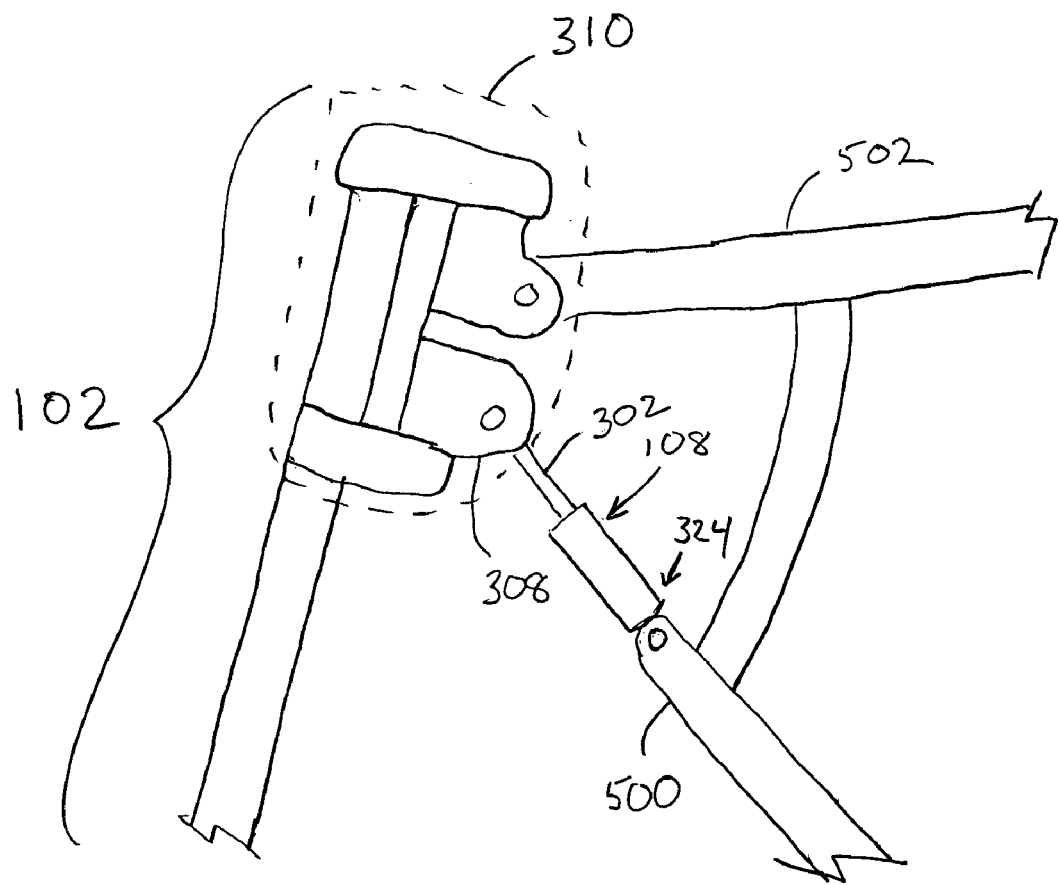
FIG. 5 shows an alternative structure of the motorcycle frame of FIG. 1 and FIG. 2.

The various components described thus far can be implemented in many types of motorcycle structures other than the structure described in FIG. 1. FIG. 5 shows one such alternative structure. Means 108 is shown having extension 302 pivotally connected to tab 308, as described with reference to FIG. 1. However, the first end 324 of means 108 is pivotally connected to lower frame member 500, rather than to upper frame member 502.

Figure 6:
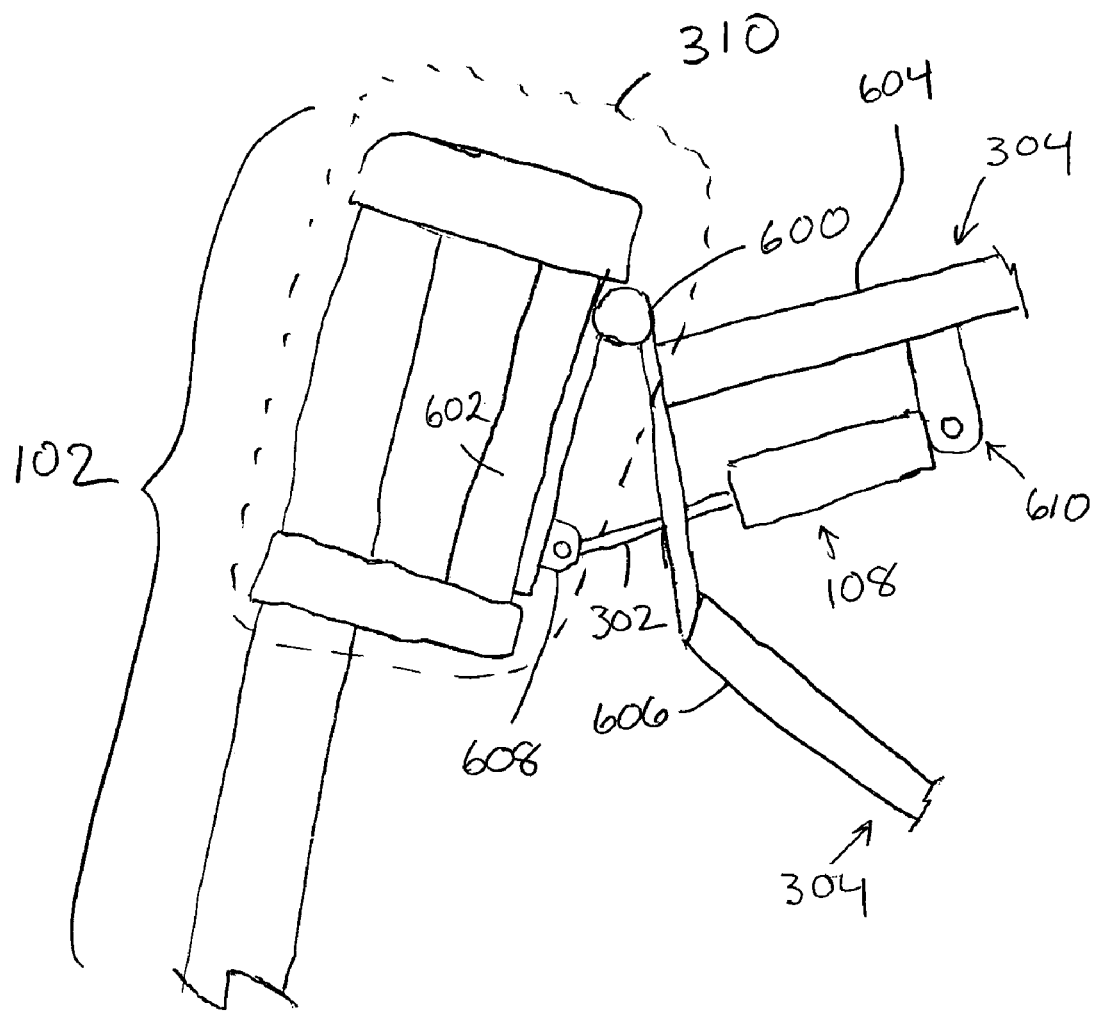
FIG. 6 shows another alternative structure of the motorcycle frame of FIG. 1 and FIG. 2.

FIG. 6 illustrates another embodiment of the structure of frame 304. This embodiment comprises a hinge 600, shown at a side view, where a first side of hinge 600 is fixedly mounted to steering column 602, while a second side is fixedly connected to both upper frame member 604 and lower frame member 606. Extension 302 of means 108 is pivotally connected to the first side of hinge 600, typically by pinning it to a tab 608 that is fixedly mounted to the first side of hinge 600. Hinge 600 may comprise a hole through the second side so that mans 108 may pass. First end 324 of means 108 is pivotally connected to a tab 610 located on either lower frame member 606 (not shown) or to member 306 of upper frame member 604.

Figure 7:
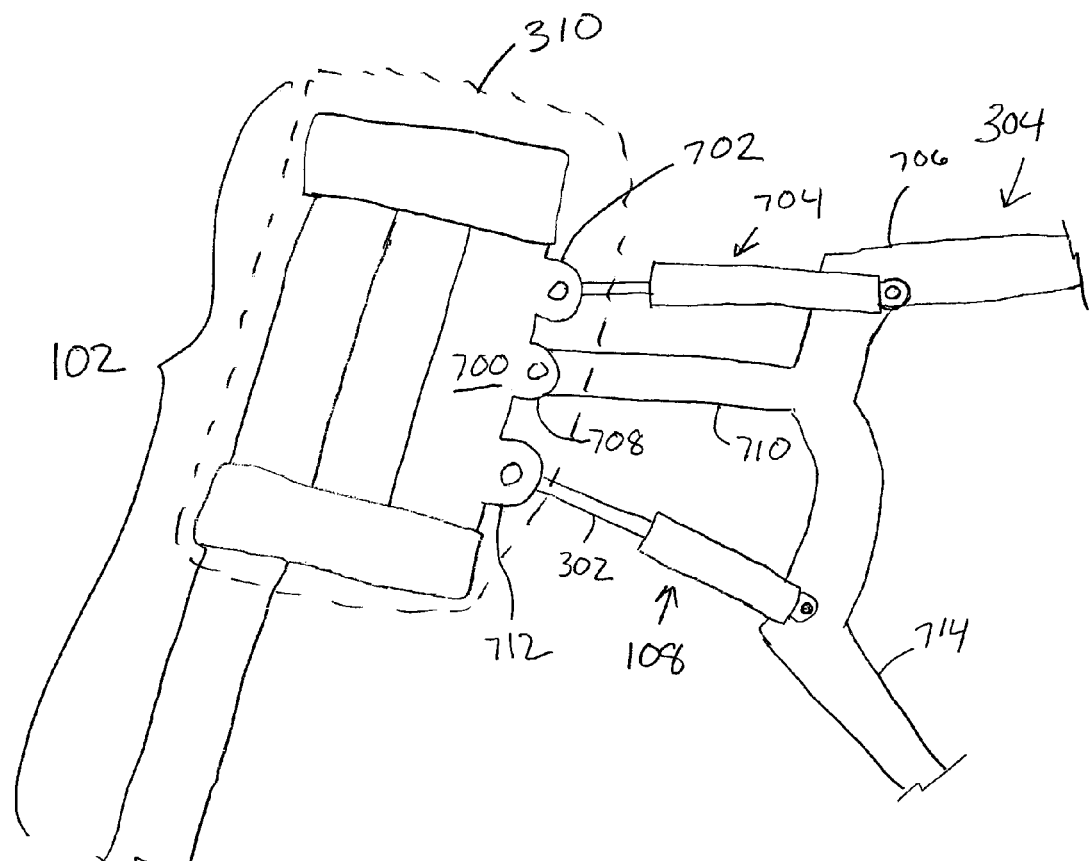
FIG. 7 illustrates yet another embodiment of the structure of the motorcycle frame of FIG. 1 and FIG. 2.

FIG. 7 illustrates yet another embodiment of the structure of frame 304. This embodiment comprises a triple-tabbed steering head 700. A first tab 702 is pivotally connected to dampening device 704, such as a spring, shock absorber, strut, or the like. The other end of dampening device 704 is pivotally connected to upper frame member 706. Middle tab 708 is pivotally connected to middle frame structure 710. Lower tab 712 is pivotally connected to extension 302, while the first end 324 of means 108 is pivotally connected to either lower frame member 714, or to some other member of frame 304 (not shown).

Figure 8:
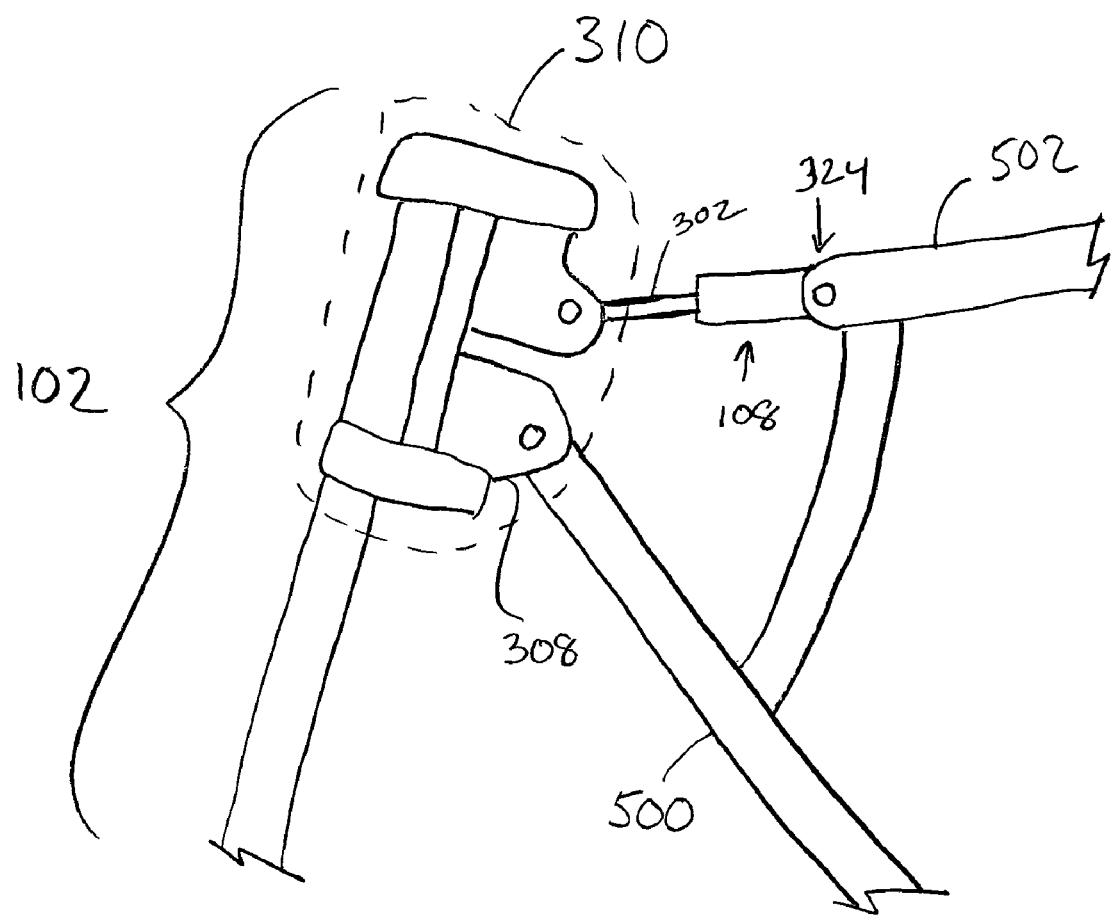
FIG. 8 illustrates still another embodiment of the structure of the motorcycle frame of FIG. 1 and FIG. 2

FIG. 8 illustrates yet another embodiment of the structure of frame 304. This embodiment comprises a similar structure to that described in FIG. 5, except that means 108 is mounted directly to upper frame member 502 instead of lower frame member 500. The operation of this embodiment is similar to that described with respect to FIG. 5.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

The invention claimed is:

1. A vehicle having at least two wheels, comprising:
   a vehicle frame;
   a front wheel assembly rotatably connected to the frame; and means for adjusting a rake angle of the front wheel assembly without disassembly of the front wheel assembly; and
   means for altering a length of the front wheel assembly.

2. The vehicle of claim 1, wherein the means for altering the length of the front wheel assembly comprises a pneumatic ram.

3. The vehicle of claim 1, further comprising:
   a pneumatic tank;
   a pneumatic line connecting the pneumatic tank to the means for altering the length of the front wheel assembly; and
   means for releasing an amount of compressed gas into the pneumatic line.

4. The vehicle of claim 1, wherein the means for altering the length of the front wheel assembly comprises a hydraulic piston.

5. The vehicle of claim 1, further comprising:
a hydraulic tank for holding fluid;
a hydraulic line connecting the tank to the means for altering the length of the front wheel assembly; and
means for forcing the fluid into the second hydraulic line.

6. The vehicle of claim 1, wherein the means for altering length of the front wheel assembly comprises:

a pneumatic ram;
a pneumatic pump;
a pneumatic line connecting the pneumatic pump to the pneumatic ram; and
means for controlling the pneumatic pump to alter the length of the pneumatic ram.

* * * * *